United States Patent [19]
Åberg et al.

[11] Patent Number: 5,762,253
[45] Date of Patent: Jun. 9, 1998

[54] BELT CONVEYOR

[75] Inventors: Kjell Åberg, Sandefjord; Roger Holt, Larvik, both of Norway

[73] Assignee: SCA Mölnlycke AB, Göteborg, Sweden

[21] Appl. No.: 793,485

[22] PCT Filed: Sep. 19, 1995

[86] PCT No.: PCT/SE95/01063

§ 371 Date: Feb. 26, 1997

§ 102(e) Date: Feb. 26, 1997

[87] PCT Pub. No.: WO96/09236

PCT Pub. Date: Mar. 28, 1996

[30] Foreign Application Priority Data

Sep. 20, 1994 [SE] Sweden ................ 9403149

[51] Int. Cl.$^6$ ................ B65H 20/00
[52] U.S. Cl. ................ 226/95; 226/170
[58] Field of Search ................ 226/95, 170

[56] References Cited

U.S. PATENT DOCUMENTS

| | | | |
|---|---|---|---|
| 3,140,030 | 7/1964 | Stewart | 226/95 |
| 3,425,610 | 2/1969 | Stewart | 226/95 |
| 3,679,112 | 7/1972 | Black et al. | 226/95 X |
| 3,706,406 | 12/1972 | Borel et al. | 226/95 |
| 5,595,334 | 1/1997 | Belec et al. | 226/95 X |

FOREIGN PATENT DOCUMENTS

| | | |
|---|---|---|
| 1781436 | 4/1973 | Germany. |
| 2 237 785 | 5/1991 | United Kingdom. |

*Primary Examiner*—Michael Mansen
*Attorney, Agent, or Firm*—Burns, Doane, Swecker & Mathis, L.L.P.

[57] ABSTRACT

A belt conveyor which includes an endless perforated belt having a top run and a bottom run, of which the top run communicates with an underlying suction box at least over a part of its length. The belt is cogwheel-driven and, seen its movement direction, includes transverse ribs which coact with the cogs of a cogwheel and a cog drive of the conveyor.

16 Claims, 2 Drawing Sheets

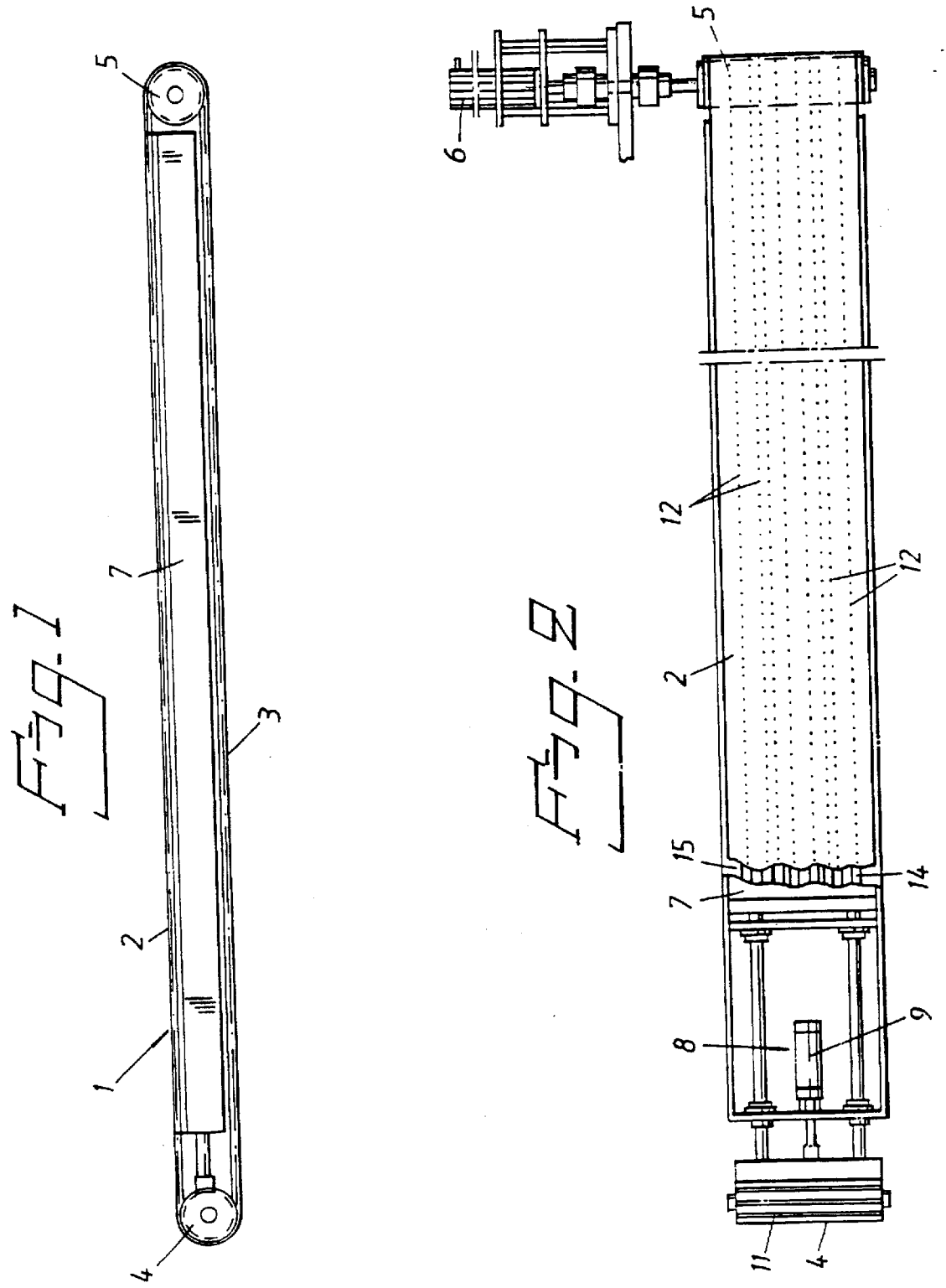

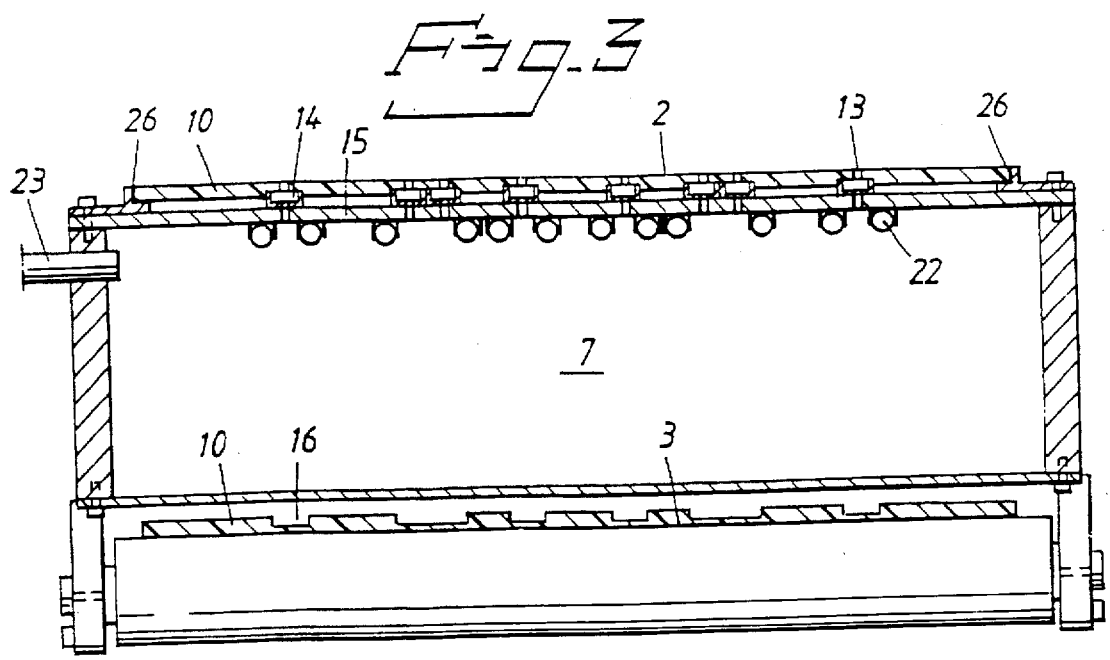
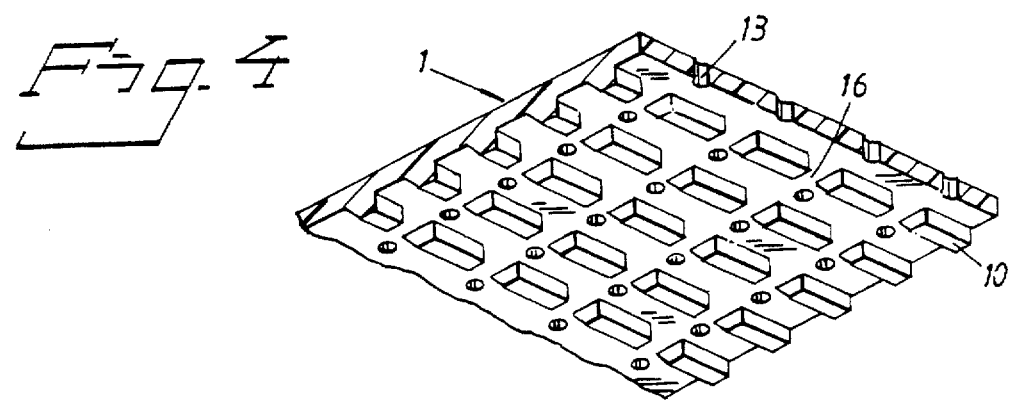
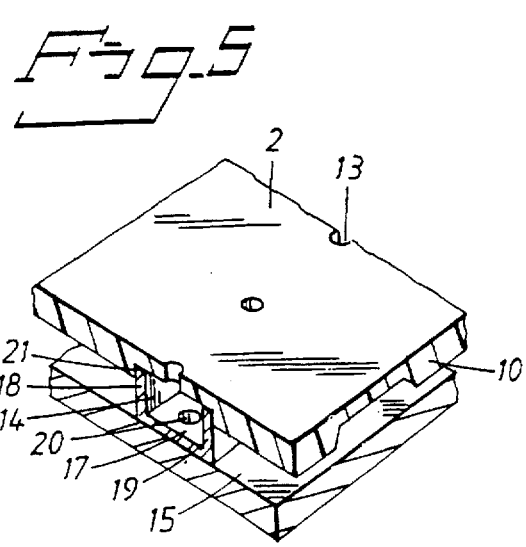

BELT CONVEYOR

TECHNICAL FIELD

The present invention relates to a belt conveyor which includes an endless perforated belt having an upper and a lower run of which the upper run communicates with an underlying suction box along at least a part of its length.

BACKGROUND OF THE INVENTION

Such conveyors are often used in production lines in the manufacture of absorbent sanitary articles, such as diapers, sanitary napkins and incontinence guards, to support a web of material which, in the finished article, form the casing sheet of an article and onto which other components of the article, such as absorbent bodies, elastic devices, etc., are placed as the web passes the various stations located sequentially in the product line. Friction-driven belts having smooth top and bottom surfaces have been used in production lines of this kind. Belt conveyors of this kind, however, are encumbered with a number of drawbacks in the present context. One problem is that the belt often slips, i.e. moves at a different speed to the belt-drive roller or drum, which makes it difficult to move the belt at a precise and constant speed and therewith maintain a constant and specific distance between the mutually sequential operations in the production line. This phenomenon can sometimes result in serious disturbances in production. One contributory cause to belt-slipping is the ingress of dirt between the drive roller and the belt, this dirt causing slipping or variations in slipping induced by other factors. The slipping phenomenon also makes adjustment of the belt to its intended running speed at the start of production both difficult to achieve and time-consuming. The belt used in such conveyors is also liable to move sideways when in operation, which results in lateral misalignment of the components placed on the moving web of material. Another problem which is particularly accentuated in long conveyors is that the pressure difference generated by the suction box between the top and bottom runs of the belt causes the belt to curve downwards during operation, which is liable to impair precision in manufacture.

SUMMARY OF THE INVENTION

The object of the present invention is to provide a belt conveyor which can be set to the desired belt-running speed readily and quickly and with which the belt will not slip so as to cause variations in the belt-running speed.

This object is achieved in accordance with the invention by means of a belt conveyor of the aforedescribed kind which is characterized in that the belt is driven by a cogwheel and includes ribs which extend transversely to the running direction of the belt and which coact with the cogs on the cogwheel and also with a cog drive on the conveyor. This enables the running speed of the belt to be set and controlled in a simple and reliable fashion, solely by adjusting and monitoring the cog drive or cog drives that drive the belt.

According to one preferred embodiment of the invention, the perforations in the belt also extend through the ribs in a pattern of longitudinally extending rows, and the ribs are recessed within the regions of the perforations so that the belt in these regions will have the same thickness as the belt in regions externally of the ribs. The upper belt run is supported by rails which extend generally along the full length of the run beneath each row of perforations, and which within the region of each suction box include upper openings which communicate with the belt perforations and lower openings which communicate with the interior of the suction box. The rails will preferably be made of a material which has good thermal conductivity, preferably bronze, and are coated on their upper surfaces with a wear-resistant layer of material which has small friction against the belt, preferably Teflon (registered trademark). The rails will preferably have a cross-sectional shape complementary to the recesses in the belt ribs, therewith preventing sideways movement of the belt. The rails preferably have a U-shaped cross-section presenting a bottom part and two upstanding legs. Each suction box will also include a cooling means for cooling the upper wall of the suction box.

BRIEF DESCRIPTION OF THE DRAWING

The invention will now be described in more detail with reference to the accompanying drawings, in which FIG. 1 is a schematic side view of a belt conveyor according to one embodiment of the invention;

FIG. 2 illustrates the belt conveyor of FIG. 1 from above, with parts of the belt and the upper wall of the suction box removed;

FIG. 3 is a schematic cross-sectional view of the belt conveyor shown in FIGS. 1 and 2;

FIG. 4 is a perspective view of part of a belt according to one embodiment of the invention;

FIG. 5 is a perspective view of part of the belt and the belt-coacting rails attached to the upper wall of the suction box; and FIG. 6 is a perspective view of part of a rail variant for use in an inventive belt conveyor.

DESCRIPTION OF THE PREFERRED EMBODIMENT

The illustrated embodiment of a belt conveyor includes an endless belt 1 having a top run 2 and a bottom run 3. The endless belt 1 runs around two wheels 4, 5, of which at least one is driven, as indicated in FIG. 2 which shows the wheel 5 driven by a motor 6. A suction box 7 is mounted between the top and bottom runs 2 and 3 of the belt 1. Also included is a tensioning device 8 which functions to keep the belt 1 stretched, by displacing the wheel 4 in the longitudinal direction of the belt. To this end, the wheel 4 of the FIGS. 1 and 2 illustration is mounted on the suction box 7 so as to be slidable in the longitudinal direction of the belt and is movable by means of a hydraulic piston-cylinder device 9. The belt 1 is preferably made of a fibre-reinforced polymer, for instance a polyurethane reinforced with fiberglass.

The inner surface of the belt 1, i.e. the surface which faces towards the suction box, is provided along the whole of its perimeter with transversely-extending ribs 10 of trapezoidal cross-section, these ribs coacting with ribs or cogs on the wheels 4 and 5, of which the ribs 11 on the wheel 4 are shown schematically in FIG. 2.

The belt 1 also includes rows 12 of through-penetrating holes or perforations 13, which communicate with the interior of the suction box 7 through openings in the upper wall 15 of said suction box and through the medium of longitudinally extending rails 14. The rails extend beneath each row 12 of perforations and the ribs 10 on the belt 1 are provided with recesses 16 which enable the inner surface of the belt 1 to lie against the upper sides of the rails 14. The rails 14 have a U-shaped cross-section having legs 18, 19 upstanding from a bottom 17. The bottoms of the rails are provided with holes 20 and corresponding holes are also provided in the upper wall 15 of the suction box.

The rails 14 thus extend beneath each row 12 of perforations 13 in the upper run 2 of the belt 1 and form local subpressure chambers in connection with the suction box 7. It is therefore only the upper run 2 of the belt 1 that is subjected to pressure load due to the pressure difference between the outside and inside of the belt within the regions of the rails 14, which constitutes a significant decrease in load as compared with the case when the subpressure prevails throughout the whole of the space between the top run of the belt and the top wall of the suction box. The rails also ensure that the top run of the belt will constantly be kept flat, which means that the components placed on the belt will always have a well-defined height position. The recesses 16 in the ribs 10 on the belt 1 will preferably have a shape which is complementary to the cross-sectional shape of the rails, therewith preventing the upper run of the belt from shifting sideways. The lateral positions of the components in relation to the conveying belt are therewith also well-defined. Since the belt is prevented from slipping by the cogwheel drive arrangement, the speed at which the belt moves is determined entirely by the peripheral speed of the cog drive, which enables the length position of components conveyed on the belt to be determined accurately and easily.

Thus, because of the local differences in pressure between the outer and inner surfaces of the top run 2 of the illustrated belt conveyor, the top run will be pressed against the upper sides of the rails 14. The friction generated between the moving belt and the upper sides of the legs 18, 19 of the rails 14 will produce heat. In order to carry away the heat that is generated, the rails are manufactured advantageously from a material which has good thermal conductivity, such as bronze for instance, and with the intention of reducing friction and therewith frictional heat, the upper sides of the rails are preferably coated with a material 21 which will have a low frictional effect on the moving belt, such as a Teflon (registered trademark) material. A cooling means may conveniently be arranged in the suction box, as shown schematically in FIG. 3. This cooling means may comprise a system of longitudinally extending pipes 22 which extend on both sides of each row of openings in the upper wall 15 of the suction box 7 and which are mutually connected at the ends of the suction box so as to obtain a meandering loop through which coolant is able to flow.

Also shown in FIG. 3 is a pipe or tube 23 through which the suction box 7 is connected to a source of subpressure, not shown. When the suction box is relatively long, several such connecting pipes may be disposed conveniently along the length of the suction box.

As will be seen from FIG. 3, when the belt is moving the side edges of the upper run 2 of the belt slide against seals 26, these seals having the dual function of keeping the outer parts of the upper belt run flat and of preventing dirt and the like penetrating between the belt and the upper wall 15 of the suction box. This greatly reduces the risk of dirt particles or the like penetrating between the upper sides of the rails and the inner surface of the upper belt run in the event of a leakage between the subpressure chambers defined by the rails 14 and ambient atmosphere in the space between the belt and the upper wall of the suction box.

FIG. 6 illustrates another guide rail 24 of U-shaped cross-section, this rail differing from the guide rails 14 by virtue of the legs that connect the rail bottom being provided with elongated openings 25 instead of the circular openings that are provided in the bottoms of respective rails 14. The rail 24 may be fitted to the upper wall of a suction box in the same way as the guide rails 14, in which case the suction box will preferably be provided with openings corresponding to the openings 25. It is, of course, also feasible to mount the rail 24 with the bottom facing upwards, i.e. with the bottom lying proximal to the conveyor belt, although this is not preferable for different reasons, one of which is the increase in friction that would result.

The present invention thus provides a suction belt conveyor in which the position of the upper side of the belt is very well-defined, both vertically and laterally, at each point of the movement path of the upper belt run. Furthermore, the speed at which the belt runs can be readily adjusted and maintained, by controlling and monitoring the belt cog drive, and the belt can also be accelerated and retarded much more quickly than a friction-driven belt, the speed of this latter type of belt being influenced by belt slipping. The cog wheel drive and the guiding effect obtained by the guide rails enable long inventive belt conveyors to be constructed, for instance conveyors of up to 30 m in length, which has not previously been possible in the case of belt conveyors of the kind defined in the introduction.

It will be understood that the described exemplifying embodiment can be modified in several respects within the scope of the invention. For instance, the conveyor may include a plurality of different suction boxes along its length, wherein the rails will also include between their extremities cross-walls which delimit the subpressure chambers defined by the rails and connected to each suction box. Furthermore, the belt cog profiles and the cog drive may have different forms than those shown and more than two cogwheels may be provided. In particular, it may be necessary to use more than one cog drive in the case of long conveyors. The pattern of perforations and therewith also the number of rails may, of course, vary and it is also conceivable to provide the belt with perforations or the like outside the regions of the rails, even though this is not preferred. The rails and the recesses in the ribs on the belt may be given another cross-sectional shape, for instance the rail may have the form of a truncated V with the legs mutually divergent, wherein the height position of the upper belt run is guided mechanically by the coacting sloping surfaces of rails and recesses. A friction-inhibiting coating may also be provided on those parts of the outer surfaces of the rails that coact with the side surfaces of the recesses. Furthermore, the belt and rails may be made of materials different to those mentioned and it is possible to provide ribs which lack recesses on the inside of the belt in the widest aspect of the inventive concept. It will therefore be understood that the invention is restricted solely by the content of the following claims.

We claim:

1. A belt conveyor system for conveying a web of thin plastic material, such as a casing sheet material for absorbent sanitary articles, in a production line for absorbent sanitary articles said belt conveyor system comprising:

an endless, perforated belt having a top run and a bottom run, at least one suction box, the top run communicating with the at least one underlying suction box at least over a part of a length of the top run, a cogwheel arrangement, the belt being driven by the cogwheel arrangement and, seen in its direction of movement, the belt includes transverse ribs which coact with cogs of a cogwheel and a cog drive of the cogwheel arrangement, the belt perforations extending in a pattern of longitudinal rows and the ribs being recessed within regions of the perforations such that the belt, with the exception of the ribs, is of uniform thickness; and rails for carrying the upper belt run, said rails extending along essentially the full length of the top belt run beneath each row of perforations, said rails including, within the region of each suction box, upper openings in communication with the belt perforations and lower openings in communication with the interior of the at least one suction box.

2. A belt conveyor system according to claim 1, wherein the rails are manufactured from material having good thermal conductivity.

3. A belt conveyor system according to claim 1, wherein the upper surface of the rails is coated with a wear-resistant layer of material of low friction against the belt.

4. A belt conveyor system according to claim 1, wherein the rails are made of bronze.

5. A belt conveyor system according to claim 1, wherein the rails have a cross-sectional shape which is complementary to the recesses in the ribs on the belt, therewith to prevent sideways movement of the top belt run.

6. A belt conveyor system according to claim 5, wherein the rails have a U-shaped cross-section with a bottom part and two upstanding legs.

7. A belt conveyor system according to claim 1, wherein each suction box includes cooling means for cooling the upper wall of said each suction box.

8. A belt conveyor system according to claim 1, wherein the pattern of longitudinal rows in the belt includes at least two longitudinal rows of perforations.

9. A belt conveyor for conveying a web of thin material, said conveyor comprising:

an endless, perforated belt having a top run and a bottom run, the top run adapted for communication with at least one underlying suction box at least over a part of a length of the top run, the belt being adapted for use on a cogwheel arrangement including a cog drive and a cogwheel having cogs, and, as seen in its direction of movement, the belt including transverse ribs which coact with cogs of the cogwheel and the cog drive, the belt perforations extending in a pattern of longitudinal rows and the ribs being recessed within regions of the perforations such that the belt, with the exception of the ribs, is of uniform thickness; and rails for carrying the upper belt run, said rails extend along essentially the full length of the top belt run beneath each row of perforations, said rails including, within the region of each suction box, upper openings in communication with the belt perforations and lower openings adapted for communication with the interior of the at least one suction box.

10. A belt conveyor according to claim 9, wherein the rails are manufactured from material having good thermal conductivity.

11. A belt conveyor according to claim 9, wherein the upper surface of the rails is coated with a wear-resistant layer of material of low friction against the belt.

12. A belt conveyor according to claim 9, wherein the rails are made of bronze.

13. A belt conveyor according to claim 9, wherein the rails have a cross-sectional shape which is complementary to the recesses in the ribs on the belt, therewith to prevent sideways movement of the top belt run.

14. A belt conveyor according to claim 13, wherein the rails have a U-shaped cross-section with a bottom part and two upstanding legs.

15. A belt conveyor according to claim 9, wherein each suction box includes cooling means for cooling the upper wall of said each suction box.

16. A belt conveyor according to claim 9, wherein the belt perforations extend in two longitudinal rows of perforations.

* * * * *